(12) United States Patent
Cheng (10) Patent No.: US 11,868,017 B1
(45) Date of Patent: Jan. 9, 2024

(54) ELECTROCHROMIC REARVIEW MIRROR

(71) Applicant: Hsin-Chun Cheng, Taiwan (TW)

(72) Inventor: Hsin-Chun Cheng, Taiwan (TW)

( * ) Notice: Subject to any disclaimer, the term of this patent is extended or adjusted under 35 U.S.C. 154(b) by 0 days.

(21) Appl. No.: 17/951,276

(22) Filed: Sep. 23, 2022

(51) Int. Cl.
*G02F 1/153* (2006.01)
*G02F 1/1333* (2006.01)
*G02F 1/163* (2006.01)
*B60R 1/08* (2006.01)

(52) U.S. Cl.
CPC ........ *G02F 1/1533* (2013.01); *G02F 1/13332* (2021.01); *G02F 1/133317* (2021.01); *G02F 1/163* (2013.01); *B60R 1/088* (2013.01); *G02F 2001/1536* (2013.01); *G02F 2202/16* (2013.01)

(58) Field of Classification Search
None
See application file for complete search history.

(56) References Cited

U.S. PATENT DOCUMENTS

9,914,395 B1    3/2018   Chen et al.

*Primary Examiner* — Richard H Kim
(74) *Attorney, Agent, or Firm* — Best & Flanagan LLP (57) ABSTRACT

An electrochromic rearview mirror contains: a first substrate, a first plating layer, a second plating layer, a packaging fringe, an electrochromic layer, a first conductive glue, a second conductive glue, at least one third plating layer, at least one fourth plating layer, a second substrate, a first electricity transmission sheet, and a second electricity transmission sheet. The first substrate includes a first face and a second face. The second substrate includes a third face and a fourth face. A respective one fourth plating layer includes a first turning extension which is rough. A respective one third plating layer includes a second turning extension which is rough. The first electricity transmission sheet includes a first conducting portion and a first contact portion. In addition, the second electricity transmission sheet includes a second conducting portion and a second contact portion.

5 Claims, 9 Drawing Sheets

ELECTROCHROMIC REARVIEW MIRROR

BACKGROUND OF THE INVENTION

Field of the Invention

The present invention relates to a rearview mirror of a vehicle, and more particularly to an electrochromic rearview mirror which is capable of producing a change of a color and changing reflectivity of lights by conducting electricity after sensing the lights, thus avoiding glares.

Description of the Prior Art

With development of technology, most rearview mirrors of vehicles are provided with electrochromic rearview mirrors that change color with environments to change reflectivity of the rearview mirrors further, thus avoiding glares. Because the rearview mirrors require to be connected to a power supply with a glass periphery of the rearview mirror to achieve an aesthetics appearance, but the power supply will not be seen from the glass periphery, a plastic shell is applied to cover the glass periphery of the rearview mirror. Alternatively, a decoration fringe is electroplated on the glass periphery of the rearview mirror closest to the user, yet the decoration fringe cannot change color. In contrast, an inner wall of the decoration fringe is color-changeable. However, a chromatic aberration between the decoration fringe and a color changeable portion is too large to maintain the aesthetics appearance. In other words, a periphery of an electroplated decorative edge around the rearview mirror will be viewable apparently.

Figure 1:
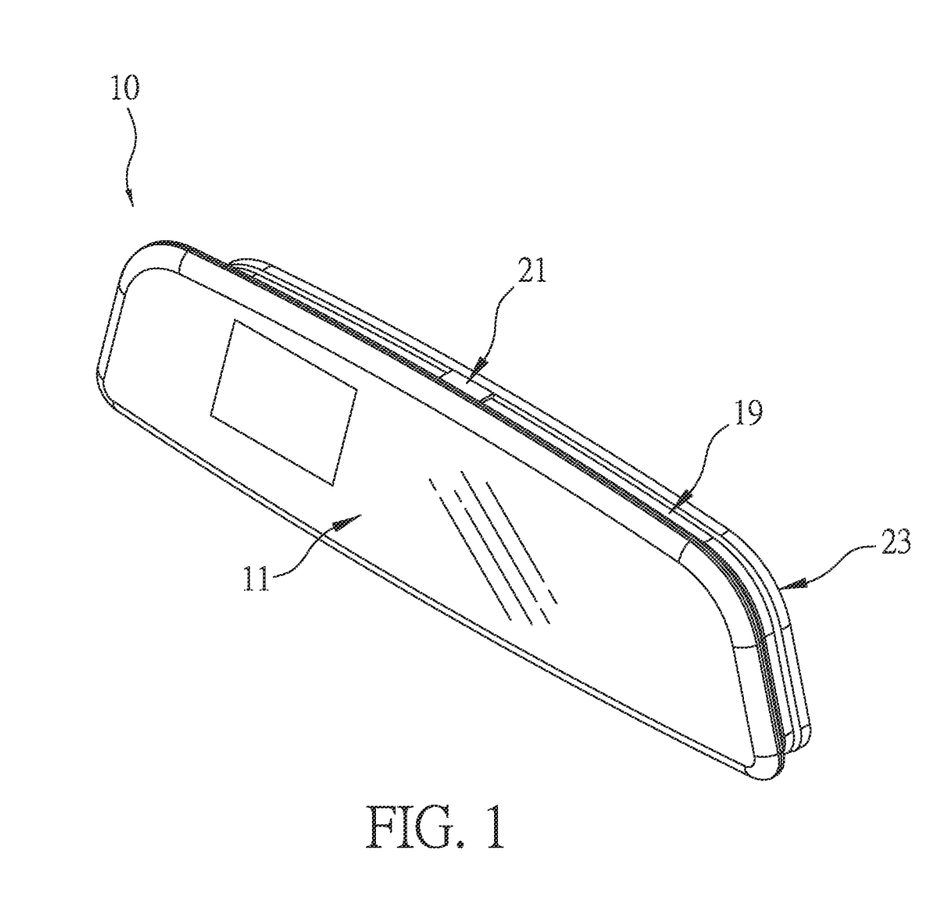
FIG. 1 is a perspective view showing the assembly of an electrochromic rearview mirror according to a preferred embodiment of the present invention.
Figure 2:
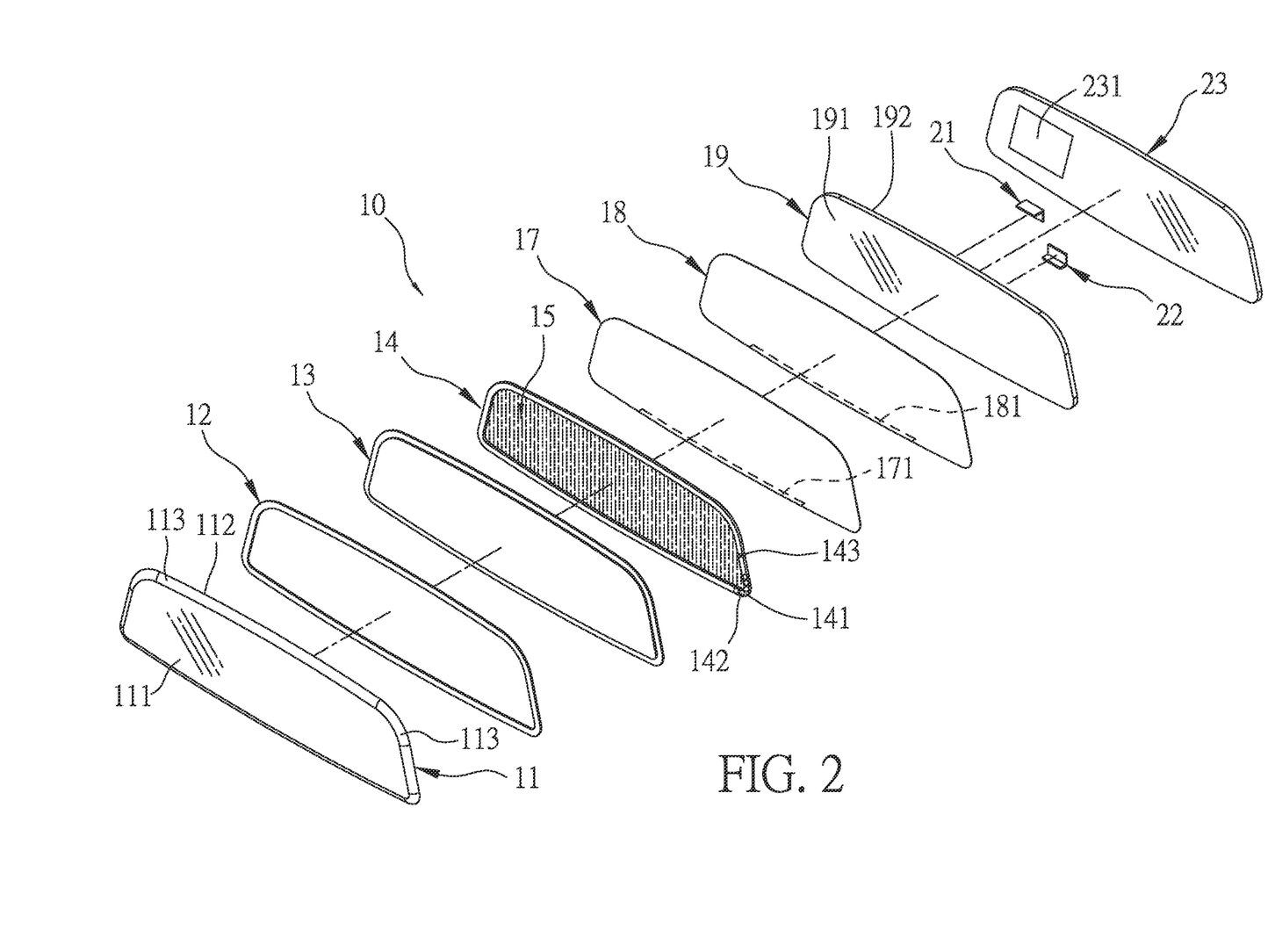
FIG. 2 is a perspective view showing the exploded components of the electrochromic rearview mirror according to the preferred embodiment of the present invention.
Figure 3:
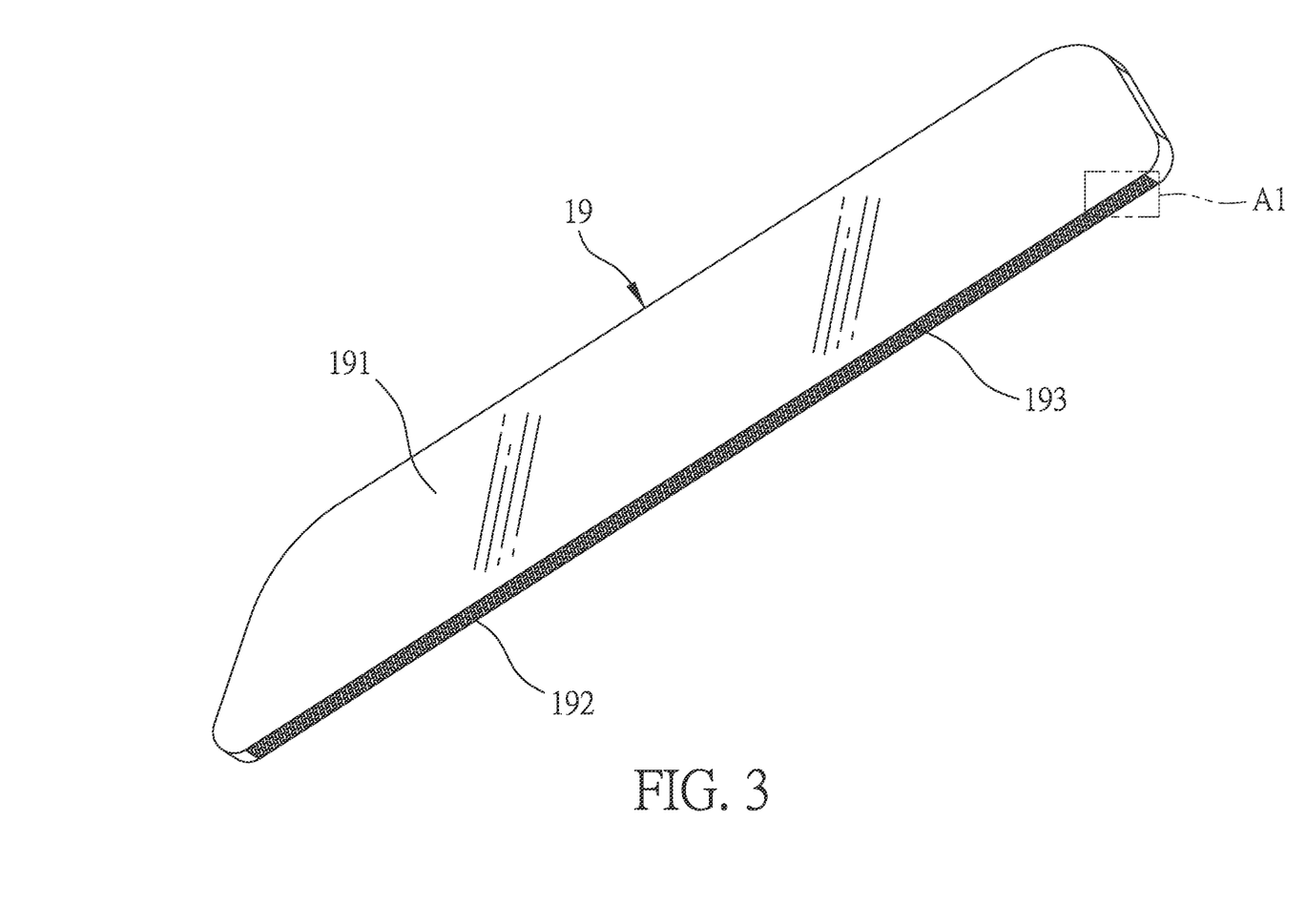
FIG. 3 is a perspective view showing the assembly of a second substrate of the electrochromic rearview mirror according to the preferred embodiment of the present invention.
Figure 4:
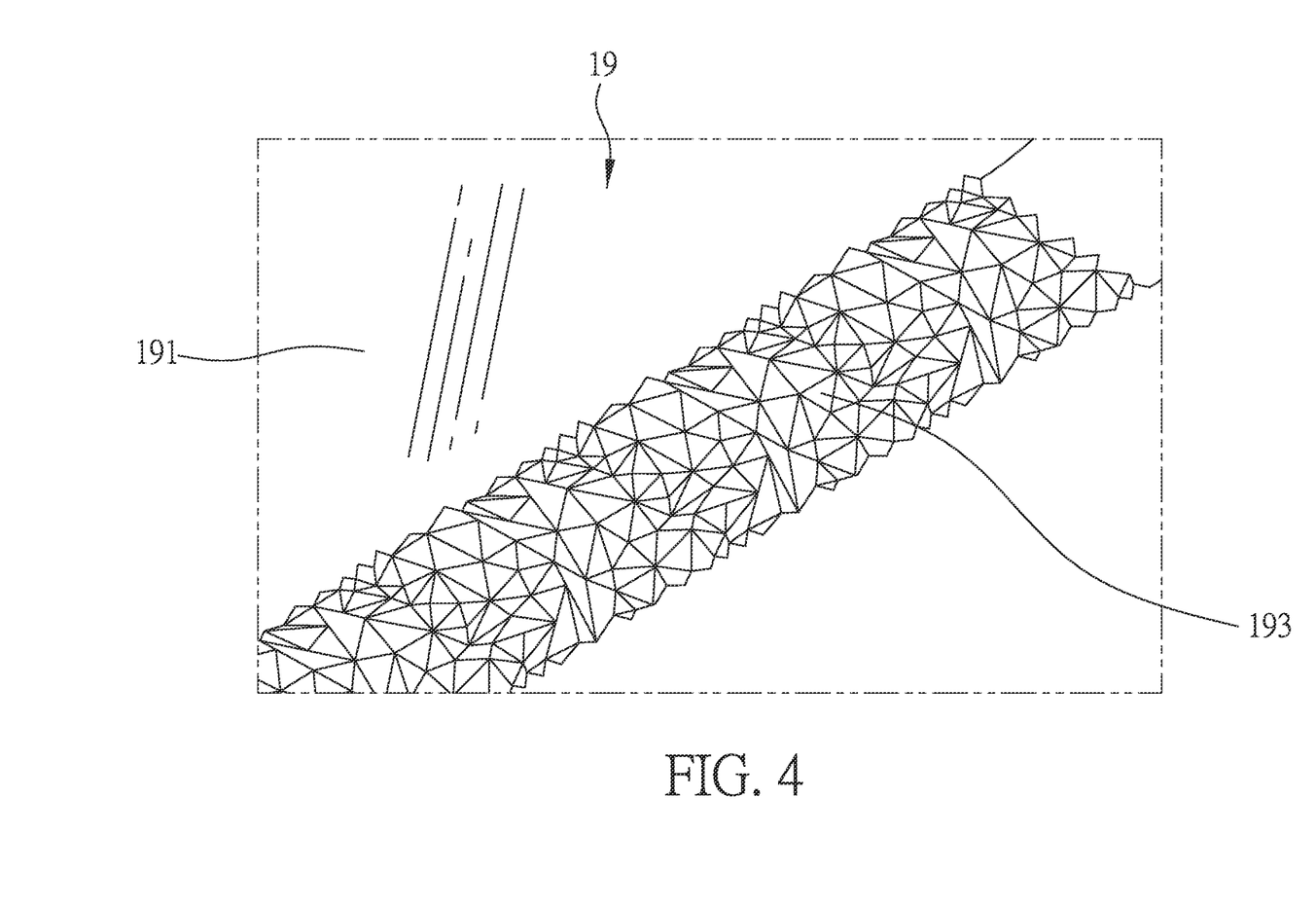
FIG. 4 is an amplified perspective view of a portion A1 of FIG. 3.
Figure 5:
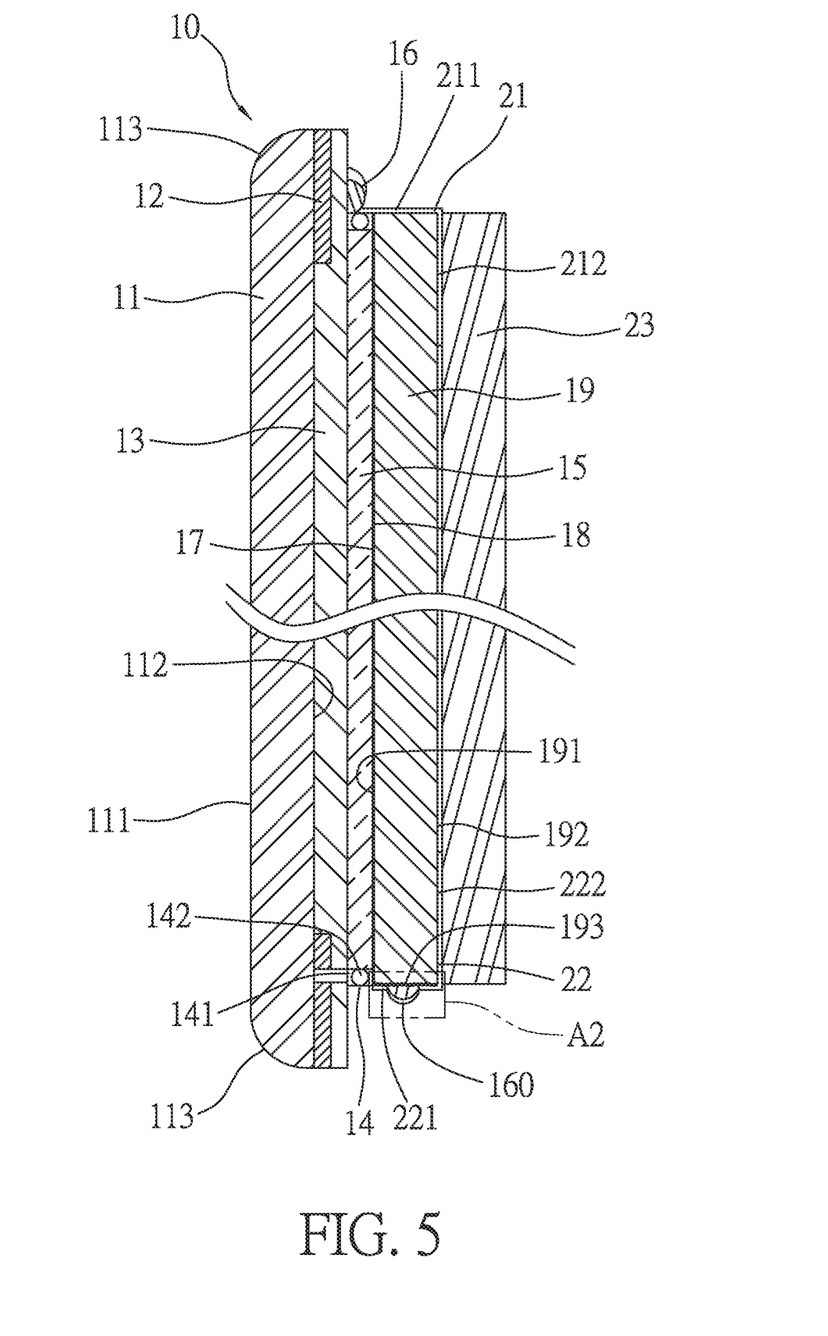
FIG. 5 is a cross sectional view showing the assembly of the electrochromic rearview mirror according to the preferred embodiment of the present invention.
Figure 6:
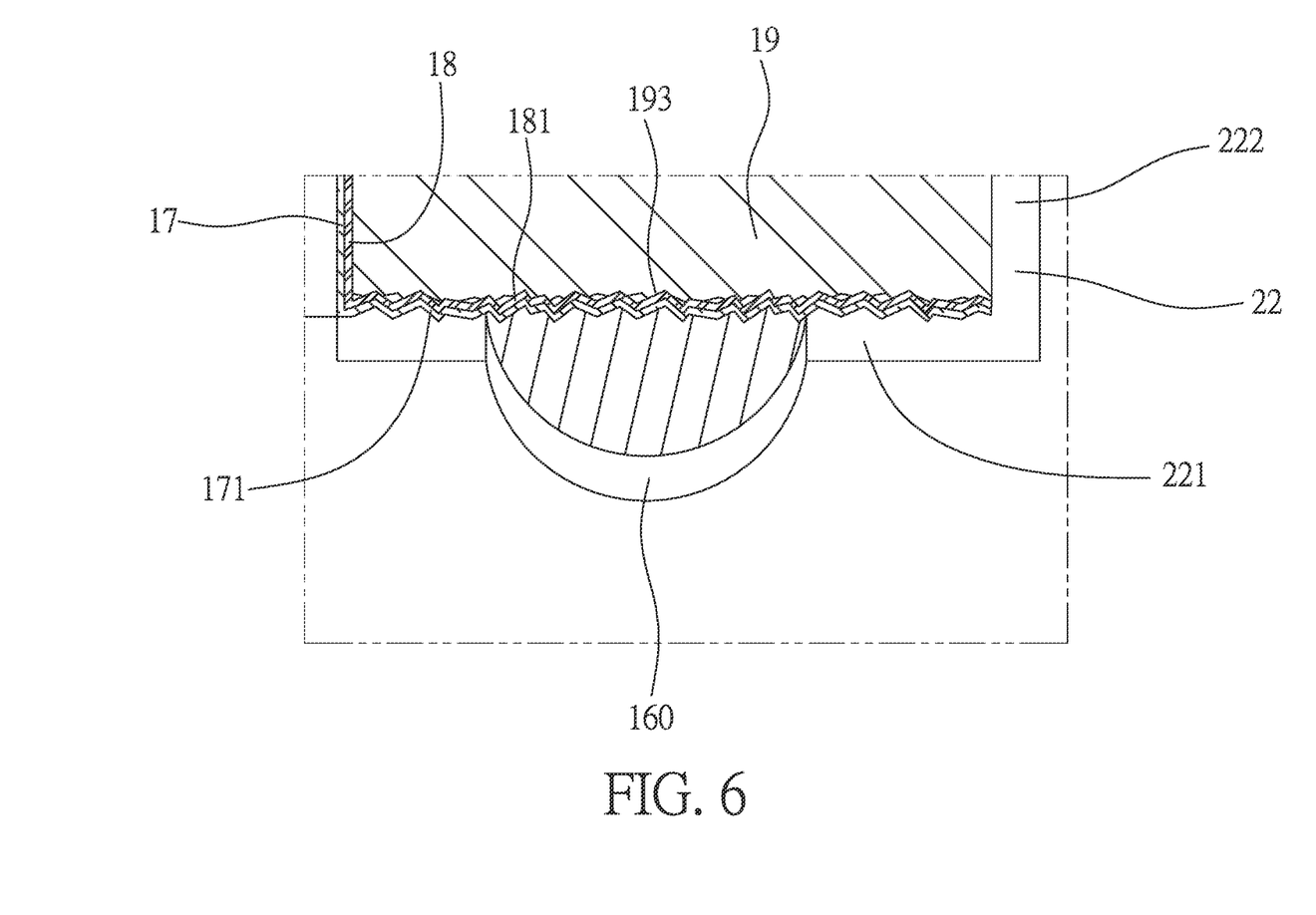
FIG. 6 is an amplified cross-sectional view of a portion A2 of FIG. 5.
Figure 7:
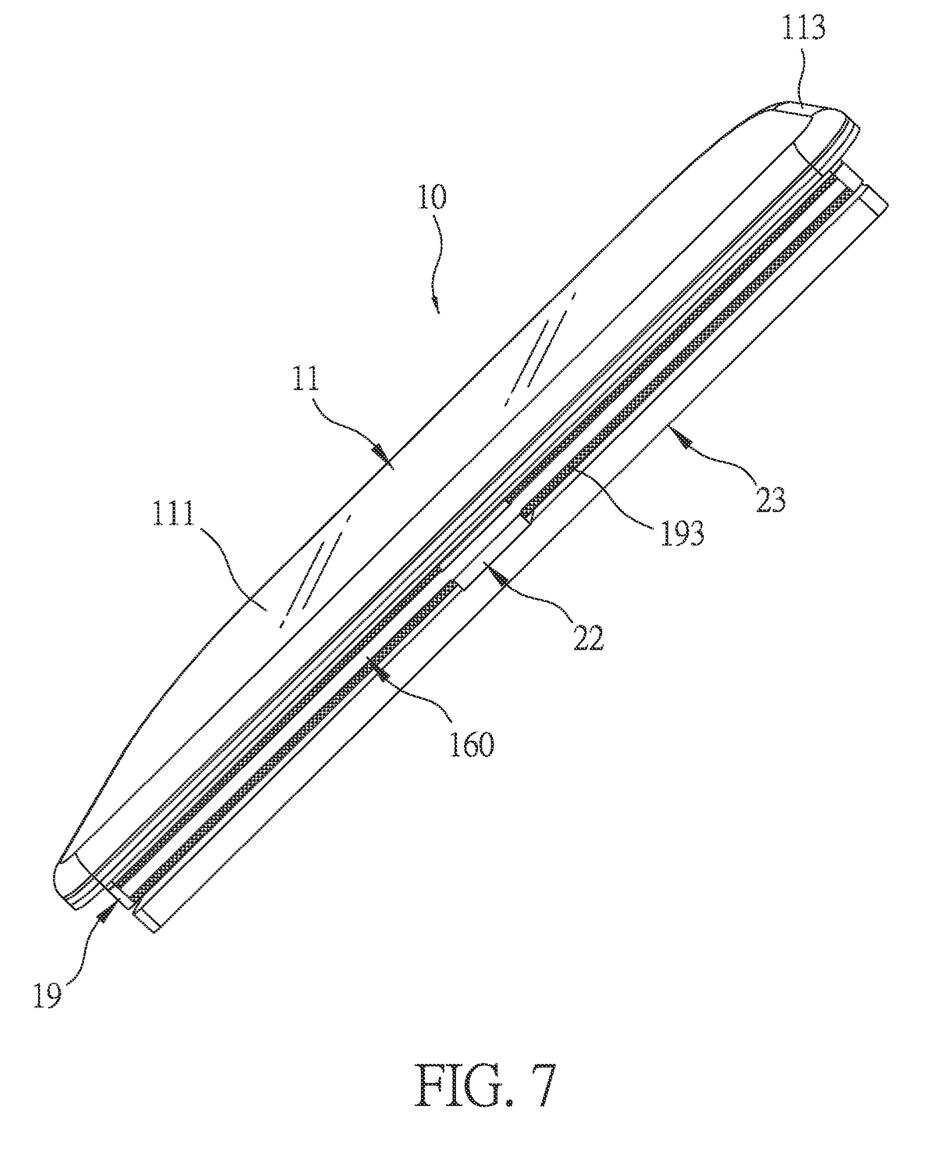
FIG. 7 is another perspective view showing the assembly of the electrochromic rearview mirror according to the preferred embodiment of the present invention.
Figure 8:
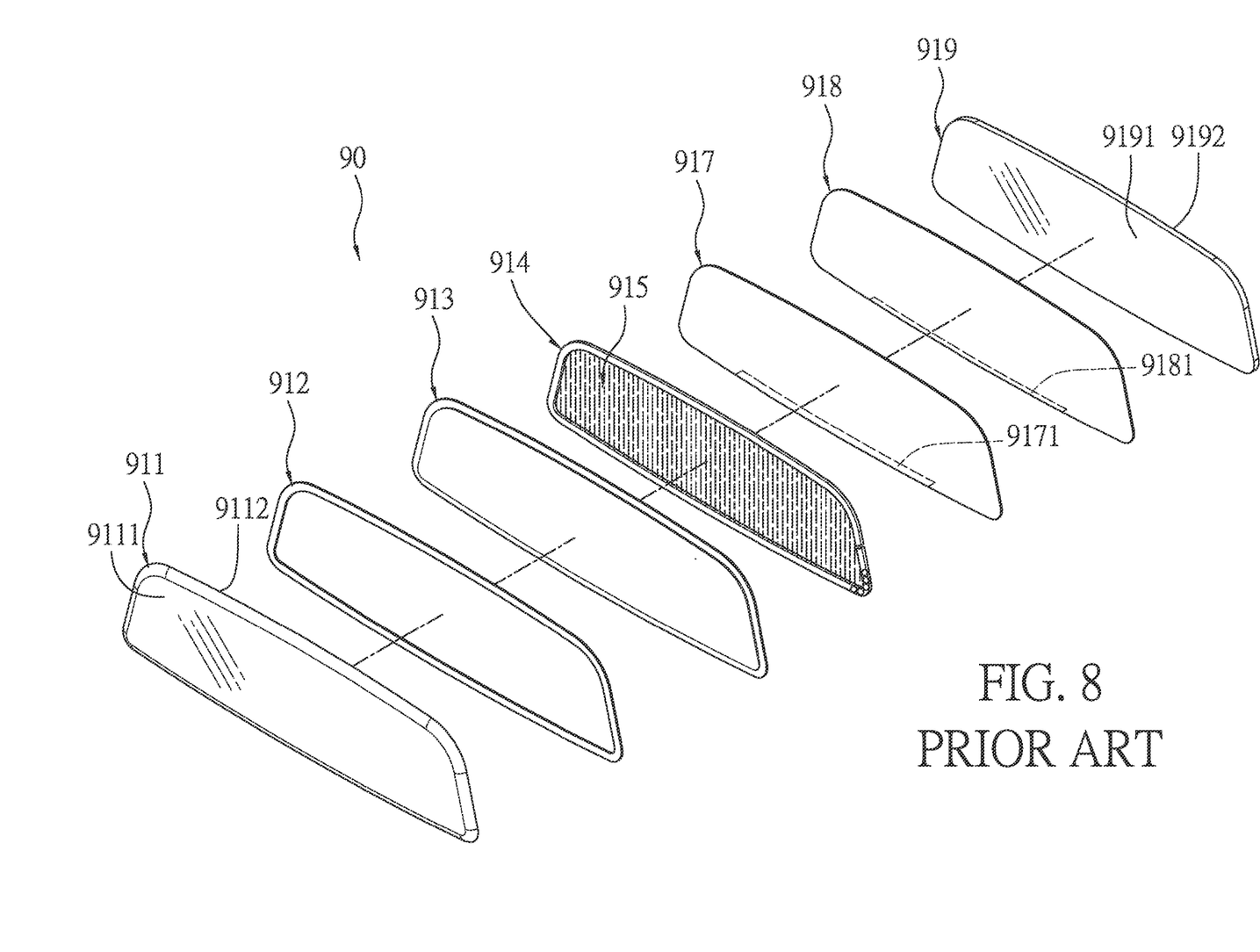
FIG. 8 is a perspective view showing the exploded components of a conventional electrochromic rearview mirror.
Figure 9:
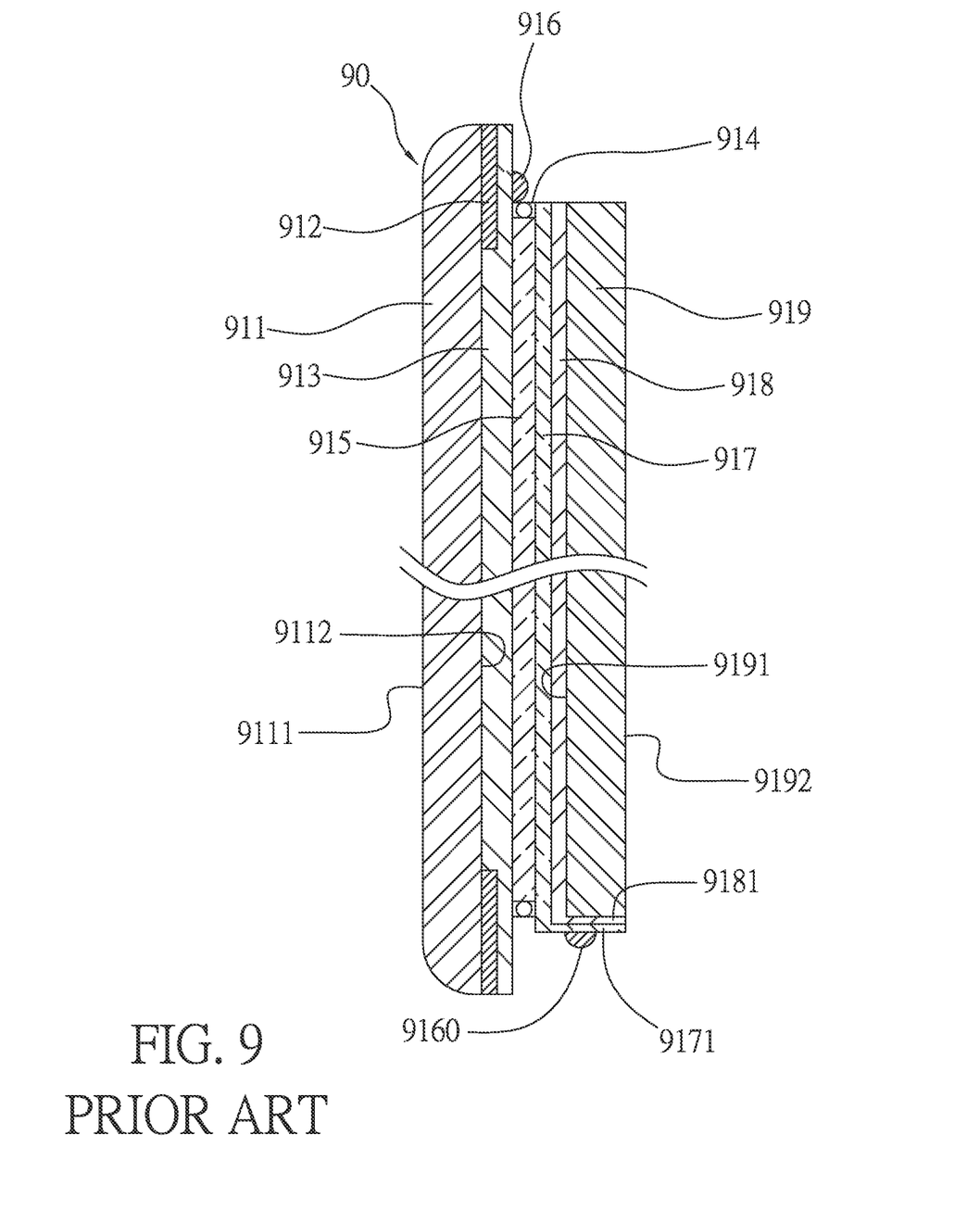
FIG. 9 is a cross sectional view showing the assembly of the conventional electrochromic rearview mirror.

A conventional electrochromic rearview mirror is disclosed in U.S. Pat. No. 9,914,395. Referring to FIGS. 8 and 9, the electrochromic rearview mirror contains a lens assembly 90, and the lens assembly 90 includes a first substrate 911, a first plating layer 912, a second plating layer 913, a packaging frame 914, an electrochromic layer 915, a first conductive glue 916, a second conductive glue 9160, at least one third plating layer 917, at least one fourth plating layer 918, and a second substrate 919. The first substrate 911 is transparent and includes a first face 9111 and a second face 9112, the first face 9111 faces a user so that the user looks to the second face 9112. The second substrate 919 includes a third face 9191 and a fourth face 9192, wherein the third face 9191 is adjacent to the second face 9112 of the first substrate 911. The first plating layer 912 is connected on an outer periphery of the second face 9112 of the first substrate 911, and the first plating layer 912 is an annular frame and is configured to shield the second plating layer 913, wherein the first plating layer 912 is configured to conduct electricity. The second plating layer 913 is transparent and is connected on the second face 9112 of the first substrate 911 to cover the first plating layer 912, and the second plating layer 913 is configured to conduct the electricity. The at least one fourth plating layer 917 is coated by metal material and is connected on and covers the third face 9191 of the second substrate 919, the at least one fourth plating layer 918 is configured to reflect images. The at least one third plating layer 917 is connected on the third face 9191 of the second substrate 919 and covers the at least one fourth plating layer 918, wherein the at least one third plating layer 917 is configured to adjust a color and conduct the electricity. The packaging frame 914 and the electrochromic layer 915 are connected among the second plating layer 913 of the first substrate 911, the at least one fourth plating layer 918 and the at least one third plating layer 917 of the second substrate 919, wherein two ends of the packaging frame 914 are closed by the second plating layer 913 and the third plating layer 917. The electrochromic layer 915 produces the color or changes chromaticity with electric currents, wherein the electrochromic layer 915 is received in a hollow portion of the packaging frame 914 and contacts with the second plating layer 913 and the at least one third plating layer 917. The first conductive glue 916 and the second conductive glue 9160 are connected on an outer wall or an outer periphery of the lens assembly 90, wherein the first conductive glue 916 electrically conducts with the second plating layer 913, and the second conductive glue 9160 electrically conducts with the at least one third plating layer 917.

However, a respective one fourth plating layer 918 includes a first turning extension 9181 extending backward from a bottom thereof, and a respective third plating layer 917 includes a second turning extension 9171 extending backward from a bottom thereof, such that the first turning extension 9181 and the second turning extension 9171 stack and adhere on the outer periphery of the second substrate 919. Since the outer periphery of the second substrate 919 is flat and has a small area, a connection of the first turning extension 9181, the second turning extension 9171, the outer periphery of the second substrate 919, the second conductive glue 9160, and the second turning extension 9171 is not strong enough to cause an easy removal.

The present invention has arisen to mitigate and/or obviate the afore-described disadvantages.

SUMMARY OF THE INVENTION

The primary object of the present invention is to provide an electrochromic rearview mirror by which connection capability and area of a respective one fourth plating layer, a third plating layer and an outer periphery of a second substrate are enhanced, a second conductive glue, a second electricity transmission sheet and the third plating layer are connected in an increasing area securely, thus avoiding an easy removal to obtain outstanding connection and durability.

To provide above-mentioned objects, an electrochromic rearview mirror provided by the present invention contains: a first substrate, a first plating layer, a second plating layer, a packaging fringe, an electrochromic layer, a first conductive glue, a second conductive glue, at least one third plating layer, at least one fourth plating layer, a second substrate, a first electricity transmission sheet, and a second electricity transmission sheet.

The first substrate is made of transparent material and includes a first face and a second face, the first face faces a user so that the user looks to the second face.

The second substrate includes a third face and a fourth face, the third face is adjacent to the second face of the first substrate, the second substrate includes a rough connection face formed on an outer periphery thereof, and a roughness value of the rough connection face is 400 nm to 1000 nm.

The first plating layer is connected on an outer periphery of the second face of the first substrate, and the first plating layer is an annular frame and is configured to shield and to conduct electricity.

The second plating layer is made of transparent material and is located on the second face of the first substrate to cover the first plating layer, and the second plating layer has a conductivity of the electricity.

The at least one fourth plating layer is coated by metal material and is connected on and covers the third face of the second substrate, and a respective one fourth plating layer is configured to reflect images, and the respective one fourth plating layer includes a first turning extension vertically extending to the second substrate and adhered on the rough connection face of the second substrate. The first turning extension is rough to correspond to the rough connection face, and a roughness value of the first turning extension is 400 nm to 1000 nm.

A respective one third plating layer is connected on the third face of the second substrate to cover the respective one fourth plating layer and is configured to adjust a color and conduct the electricity. The respective one third plating layer includes a second turning extension vertically extending to the second substrate and adhered on the first turning extension of the respective one fourth plating layer. The second turning extension is rough to correspond to the first turning extension, and a roughness value of the second turning extension is 400 nm to 1000 nm.

The packaging fringe and the electrochromic layer are defined among the second plating layer of the first substrate, the respective one fourth plating layer and the respective one third plating layer of the second substrate. The packaging fringe is an annular frame and surrounds the electrochromic layer, the packaging fringe includes a hollow accommodation space defined on a center thereof and includes two ends closed by the second plating layer and the respective one third plating layer.

The electrochromic layer produces a color or changes in a brightness, the electrochromic layer is received in the hollow accommodation space of the packaging fringe and contacts with the second plating layer and the respective one third plating layer.

The first electricity transmission sheet is made of conductive metal and includes a first conducting portion formed on a first end thereof, and the first electricity transmission sheet includes a first contact portion formed on a second end thereof. The first electricity transmission sheet is arranged on the outer periphery of the second substrate, and the first conducting portion electrically contacts with the second plating layer.

The second electricity transmission sheet is made of conductive metal and includes a second conducting portion formed on a first end thereof, and the second electricity transmission sheet includes a second contact portion formed on a second end thereof. The second electricity transmission sheet is arranged on the outer periphery of the second substrate, and a part of the second conducting portion electrically contacts with the second turning extension of the respective one third plating layer. The part of the second conducting portion is rough to correspond to the second turning extension, and the first contact portion and the second contact portion are electrically connected with two electrodes of a power supply.

The first conductive glue and the second conductive glue are arranged on an outer wall or an outer periphery of the electrochromic rearview mirror, the first conductive glue electrically contacts with the second plating layer, the second conductive glue is electrically connected with the second turning extension of the respective one third plating layer, and a part of the second conductive glue contacts with the second turning extension. The part of the second conductive glue is rough to correspond to the second turning extension.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

With reference to FIGS. 1 to 7, an electrochromic rearview mirror 10 according to a preferred embodiment of the present invention comprises: a first substrate 11, a first plating layer 12, a second plating layer 13, a packaging fringe 14, an electrochromic layer 15, a first conductive glue 16, a second conductive glue 160, at least one third plating layer 17, at least one fourth plating layer 18, a second substrate 19, a first electricity transmission sheet 21, and a second electricity transmission sheet 22.

The first substrate 11 is made of transparent material (such as glass or acrylic), and the first substrate 11 includes a first face 111 and a second face 112, wherein the first face 111 faces a user so that the user looks at the second face 112, and the first substrate 11 further includes an arcuate fringe 113 surrounding an outer periphery of the first face 111.

The second substrate 19 includes a third face 191 and a fourth face 192, wherein the third face 191 is adjacent to the second face 112 of the first substrate 11, the second substrate 19 includes a rough connection face 193 formed on an outer periphery thereof, wherein a roughness value of the rough connection face 193 is 400 nm to 1000 nm, and the outer periphery of the second substrate 19 is less than the periphery of the first substrate 11.

The first plating layer 12 is connected on an outer periphery of the second face 112 of the first substrate 11, and the first plating layer 12 is an annular frame and is configured to shield and to conduct electricity, wherein the arcuate fringe 113 of the first substrate 11 is located inside the first plating layer 12.

The second plating layer 13 is made of transparent material and is located on the second face 112 of the first substrate 11 to cover the first plating layer 12, wherein a size of the outer periphery of the second plating layer 13 is equal to a size of the periphery of the first substrate 11, and the second plating layer 12 has a conductivity of the electricity, wherein the first plating layer 12 is connected on the second plating layer 13 and faces the second face 112 of the first substrate 11.

The at least one fourth plating layer 18 is coated by metal material, and the metal material is any one of silver, chrome and chrome alloy, wherein one or more than one fourth plating layer 18 is provided. In this embodiment, a fourth plating layer 18 is provided and is connected on the third face 191 of the second substrate 19 to cover the third face 191, wherein the fourth plating layer 18 is configured to reflect images, and an outer periphery of the fourth plating layer 18 is less than the outer periphery of the first substrate 11, the fourth plating layer 18 includes a first turning extension 181 vertically extending to the second substrate 19 and adhered on the rough connection face 193 of the second substrate 19, wherein the first turning extension 181 is rough to correspond to the rough connection face 193, and a roughness value of the first turning extension 181 is 400 nm to 1000 nm.

A respective one third plating layer 17 is connected on the third face 191 of the second substrate 19 to cover the fourth plating layer 18 and is configured to adjust a color and conduct the electricity, wherein a size of the outer periphery of the third plating layer 17 is less than a size of the outer periphery of the first substrate 11, the respective one third plating layer 17 includes a second turning extension 171 vertically extending to the second substrate 19 and adhered on the first turning extension 181 of the fourth plating layer 18, wherein the second turning extension 171 is rough to correspond to the first turning extension 181, and a roughness value of the second turning extension 171 is 400 nm to 1000 nm. In another embodiment, the fourth plating 18 is configured to adjust the color, and the third plating layer 17 is configured to reflect the images.

The packaging fringe 14 and the electrochromic layer 15 are defined among the second plating layer 13 of the first substrate 11, the fourth plating layer 18 and the respective one third plating layer 17 of the second substrate 19, wherein the packaging fringe 14 includes an adhesive portion 141 and multiple glass balls 142, wherein the multiple glass balls 142 are configured to provide a spaced distance between the first substrate 11 and the second substrate 19 so as to accommodate the electrochromic layer 15, and a size of an outer periphery of the packaging fringe 14 is less than the size of the outer periphery of the first substrate 11.

The packaging fringe 14 is an annular frame and surrounds the electrochromic layer 15, wherein the packaging fringe 14 includes a hollow accommodation space defined on a center thereof and includes two ends closed by the second plating layer 13 and the respective one third plating layer 17, and the packaging fringe 14 includes a cutout 143 defined on a portion thereof.

The electrochromic layer 15 is liquid or colloidal and produces a color or changes in a brightness, the electrochromic layer 15 is received in the hollow accommodation space of the packaging fringe 14 and contacts with the second plating layer 13 and the third plating layer 17, wherein the electrochromic layer 15 is fed into the cutout 141 of the packaging fringe 14 to be full of the hollow accommodation space of the packaging fringe 14, then the cutout 141 is closed and solidified by the glue to avoid a leakage of the electrochromic layer 15.

The first electricity transmission sheet 21 is made of conductive metal and includes a thickness of 0.05 mm to 0.1 mm, the first electricity transmission sheet 21 includes a first conducting portion 211 formed on a first end thereof, and the first electricity transmission sheet 21 includes a first contact portion 212 formed on a second end thereof, wherein the first electricity transmission sheet 21 is arranged on the outer periphery of the second substrate 19, and the first conducting portion 211 electrically contacts with the second plating layer 13.

The second electricity transmission sheet 22 is made of conductive metal and includes a thickness of 0.05 mm to 0.1 mm, the second electricity transmission sheet 22 includes a second conducting portion 221 formed on a first end thereof, and the second electricity transmission sheet 22 includes a second contact portion 222 formed on a second end thereof, wherein the second electricity transmission sheet 22 is arranged on the outer periphery of the second substrate 19, and a part of the second conducting portion 221 electrically contacts with the second turning extension 171 of the third plating layer 17, wherein the part of the second conducting portion 221 is rough to correspond to the second turning extension 171, and the first contact portion 212 and the second contact portion 222 are electrically connected with two electrodes of a power supply.

The first conductive glue 16 and the second conductive glue 160 are arranged on an outer wall or an outer periphery of the electrochromic rearview mirror 10, the first conductive glue 16 electrically contacts with the second plating layer 13 directly or via the first plating layer 12 indirectly, the second conductive glue 160 is electrically connected with the second turning extension 171 of the third plating layer 17, and a part of the second conductive glue 160 contacts with the second turning extension 171, wherein the part of the second conductive glue 160 is rough to correspond to the second turning extension 171.

The at least one fourth plating layer 18 is at least one metal plating layer and includes at least one oxide layer.

The electrochromic rearview mirror 10 includes a shielding layer 23 on which a monitor (not shown) is connected, wherein the shielding layer 23 is arranged on the fourth face 192 of the second substrate 19 and has at least one viewable portion 231, and the at least one viewable portion 231 is configured to display a driving record, a reversing image, a satellite navigation, a tire pressure, a driving speed, and an electronic toll collection for the monitor.

Accordingly, the electrochromic rearview mirror of the present invention has following advantages:

the second substrate 19 includes the rough connection face 193 formed on the outer periphery thereof so as to stack and adhere the first turning extension 181 of the fourth plating layer 18 and the second turning extension 171 of the third plating layer 17, wherein the first turning extension 181 and the second turning extension 171 are rough to enhance connection capability and area of the fourth plating layer 18, the third plating layer 17 and the outer periphery of the second substrate 19 and to connect the second conductive glue 160, the second electricity transmission sheet 22 and the third plating layer 17 in an increasing area securely, thus obtaining outstanding connection and durability.

While various embodiments in accordance with the present invention have been shown and described, it is clear to those skilled in the art that further embodiments may be made without departing from the scope of the present invention.

What is claimed is:
1. An electrochromic rearview mirror comprising:
a first substrate, a first plating layer, a second plating layer, a packaging fringe, an electrochromic layer, a first conductive glue, a second conductive glue, at least one third plating layer, at least one fourth plating layer, a second substrate, a first electricity transmission sheet, and a second electricity transmission sheet;

wherein the first substrate is made of transparent material and includes a first face and a second face, the first face faces a user so that the user looks to the second face;

wherein the second substrate includes a third face and a fourth face, the third face is adjacent to the second face of the first substrate, the second substrate includes a rough connection face formed on an outer periphery thereof, wherein a roughness value of the rough connection face is 400 nm to 1000 nm;

wherein the first plating layer is connected on an outer periphery of the second face of the first substrate, and the first plating layer is an annular frame and is configured to shield and to conduct an electricity;

wherein the second plating layer is made of transparent material and is located on the second face of the first substrate to cover the first plating layer, wherein the second plating layer has a conductivity of the electricity;

wherein the at least one fourth plating layer is coated by metal material and is connected on and covers the third face of the second substrate, and a respective one fourth plating layer is configured to reflect images, and the respective one fourth plating layer includes a first turning extension vertically extending to the second substrate and adhered on the rough connection face of the second substrate, wherein the first turning extension is rough to correspond to the rough connection face, and a roughness value of the first turning extension is 400 nm to 1000 nm;

wherein a respective one third plating layer is connected on the third face of the second substrate to cover the respective one fourth plating layer and is configured to adjust a color and conduct the electricity, wherein the respective one third plating layer includes a second turning extension vertically extending to the second substrate and adhered on the first turning extension of the respective one fourth plating layer, wherein the second turning extension is rough to correspond to the first turning extension, and a roughness value of the second turning extension is 400 nm to 1000 nm;

wherein the packaging fringe and the electrochromic layer are defined among the second plating layer of the first substrate, the respective one fourth plating layer and the respective one third plating layer of the second substrate, wherein the packaging fringe is an annular frame and surrounds the electrochromic layer, the packaging fringe includes a hollow accommodation space defined on a center thereof and includes two ends closed by the second plating layer and the respective one third plating layer;

wherein the electrochromic layer produces a color or changes in a brightness, the electrochromic layer is received in the hollow accommodation space of the packaging fringe and contacts with the second plating layer and the respective one third plating layer;

wherein the first electricity transmission sheet is made of conductive metal and includes a first conducting portion formed on a first end thereof, and the first electricity transmission sheet includes a first contact portion formed on a second end thereof, wherein the first electricity transmission sheet is arranged on the outer periphery of the second substrate, and the first conducting portion electrically contacts with the second plating layer;

wherein the second electricity transmission sheet is made of conductive metal and includes a second conducting portion formed on a first end thereof, and the second electricity transmission sheet includes a second contact portion formed on a second end thereof, wherein the second electricity transmission sheet is arranged on the outer periphery of the second substrate, and a part of the second conducting portion electrically contacts with the second turning extension of the respective one third plating layer, wherein the part of the second conducting portion is rough to correspond to the second turning extension, and the first contact portion and the second contact portion are electrically connected with two electrodes of a power supply; and wherein the first conductive glue and the second conductive glue are arranged on an outer wall or an outer periphery of the electrochromic rearview mirror, the first conductive glue electrically contacts with the second plating layer, the second conductive glue is electrically connected with the second turning extension of the respective one third plating layer, and a part of the second conductive glue contacts with the second turning extension, wherein the part of the second conductive glue is rough to correspond to the second turning extension.

2. The electrochromic rearview mirror as claimed in claim 1, wherein the first electricity transmission sheet includes a thickness of 0.05 mm to 0.1 mm, and the second electricity transmission sheet includes a thickness of 0.05 mm to 0.1 mm.

3. The electrochromic rearview mirror as claimed in claim 1, wherein the at least one fourth plating layer is at least one metal plating layer and includes at least one oxide layer.

4. The electrochromic rearview mirror as claimed in claim 1, wherein the electrochromic rearview mirror includes a shielding layer on which a monitor is connected, wherein the shielding layer is arranged on the fourth face of the second substrate and has at least one viewable portion, and the at least one viewable portion is configured to display a driving record, a reversing image, a satellite navigation, a tire pressure, a driving speed, and an electronic toll collection for the monitor.

5. The electrochromic rearview mirror as claimed in claim 1, wherein the first conductive glue electrically contacts with the second plating layer via the first plating layer.

* * * * *